(12) United States Patent
Uemura et al.

(10) Patent No.: US 6,811,481 B2
(45) Date of Patent: Nov. 2, 2004

(54) AIR PASSAGE SWITCHING DEVICE

(75) Inventors: Yukio Uemura, Nagoya (JP); Tomohide Shindo, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/653,441

(22) Filed: Sep. 2, 2003

(65) Prior Publication Data

US 2004/0043720 A1 Mar. 4, 2004

(30) Foreign Application Priority Data

Sep. 3, 2002 (JP) .................................. 2002-257878

(51) Int. Cl.⁷ .............................................. B60H 1/24
(52) U.S. Cl. ........................ 454/69; 454/156; 251/901
(58) Field of Search ........................... 454/69, 121, 156, 454/159, 160, 162; 165/42, 43; 251/901

(56) References Cited

U.S. PATENT DOCUMENTS

| | | | | |
|---|---|---|---|---|
| 5,326,315 A | * | 7/1994 | Inoue et al. ................ | 454/126 |
| 5,931,733 A | * | 8/1999 | Danieau ...................... | 454/69 |
| 6,508,703 B1 | | 1/2003 | Uemura et al. | |
| 2001/0008148 A1 | * | 7/2001 | Ito et al. ................. | 137/625.46 |
| 2002/0146976 A1 | * | 10/2002 | Nishikawa et al. ......... | 454/152 |
| 2002/0197951 A1 | | 12/2002 | Uemura et al | |

FOREIGN PATENT DOCUMENTS

JP          8-2238           1/1996

* cited by examiner

*Primary Examiner*—Harold Joyce
(74) *Attorney, Agent, or Firm*—Harness, Dickey & Pierce, PLC

(57) ABSTRACT

In an air passage switching device, a flexible film moves to traverse an air passage of an air duct, thereby switching and controlling a communication state of the air passage. A thickness t of the film, a glass transition temperature Tg thereof and a radius of curvature r thereof are set so that a relationship expressed by a formula of $t \leq (0.00578 \times Tg^{0.448} \times r^{0.333})$ is satisfied and a bending stiffness of the film is set equal to or higher than 1 $\mu N \cdot m^2$. Accordingly, the film can be restricted from being buckling-deformed and from being damaged. As a result, an air leakage amount from a clearance between the film and the air passage due to the deformation can be effectively restricted.

7 Claims, 5 Drawing Sheets

AIR PASSAGE SWITCHING DEVICE

CROSS-REFERENCE TO RELATED APPLICATION

This application is related to and claims priority from Japanese Patent Application No. 2002-257878 filed on Sep. 3, 2002, the content of which is hereby incorporated by reference.

BACKGROUND OF THE INVENTION

1. Field of the Invention

The present invention relates to an air passage switching device for switching and controlling a communication state of an air passage by moving a film member in the air passage. The air passage switching device is suitably used for a vehicle air conditioner.

2. Description of Related Art

An air passage switching device for switching an air passage by moving a film member is disclosed in JP-A-8-2238. In this air passage switching device, both ends of the film member are connected to a driving shaft and a driven shaft, respectively. In this way, the film member is wound around one of both shafts and is wound off from the other thereof. Thus, the driving and driven shafts are required to be rotated while being operatively linked to each other, and a link mechanism such as a pulley and a wire is required. As a result, the number of components of the air passage switching device is increased, and assembling operation is complicated, thereby increasing production cost of the device.

In view of the above problem, U.S. Pat. No. 6,508,703 (corresponding to JP-A-2002-79819) proposes a simple air-passage switching device without using a link mechanism. In this air passage switching device, the film member is moved so as to be extruded. However, the film member may be buckling-deformed and damaged when being extruded. Further, the film member may be permanently deformed when being left in the buckling-deformed state for a long time. In this case, a clearance is caused between the film member and an outer peripheral portion of an opening that is opened and closed by the film member. Therefore, air leaks from the clearance, sealing performance of the film member is reduced, and the air passage cannot be closed by the film member.

SUMMARY OF THE INVENTION

In view of the above-described problems, it is an object of the present invention to provide an air passage switching device capable of restricting its film member from being damaged.

It is another object of the present invention to effectively reduce an air leakage amount in the air passage switching device.

According to the present invention, an air passage switching device includes an air duct for defining an air passage through which air flows, a flexible film member being movable to traverse the air passage for switching and controlling a communication state of the air passage, and a driving unit that extrudes the film member so as to move the film member. In the air passage switching device, the film member has a bending stiffness equal to or larger than 1 $\mu N \cdot m^2$. When the film member has the bending stiffness equal to or larger than 1 $\mu N \cdot m^2$, a bucking-generation operation force for causing a buckling-deformation of the film member is larger than a general operation force for moving the film member. Accordingly, it can restrict the film member from being buckling-deformed, and from being damaged. Generally, the film member is made of resin.

Alternatively, in the air passage switching device of the present invention, the film member has a thickness t (mm), a glass transition temperature Tg (° K) and a radius of curvature r (mm) so that a relationship expressed by a formula of $t \leq (0.00578 \times Tg^{0.448} \times r^{0.333})$ is satisfied. In this case, it can effectively restrict a deformation of the film member, thereby effectively reducing an air leakage due to the deformation in the air passage switching device.

Preferably, the air duct has a guide member for guiding a movement of the film member, and the driving unit includes a frame member provided in the air duct, a gear member provided in the frame member, and a driving member engaged with the gear member to move the frame member in a moving direction. Further, one end of the film member is connected to the frame member and the other end of the film member is a free end in the moving direction so that the film member is movable along the guide member in accordance with the movement of the frame member. Even this case, the air passage switching device effectively restricts buckling-deformation of the film member, and an air leakage due to the buckling deformation.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the appended drawings.

Figure 1:
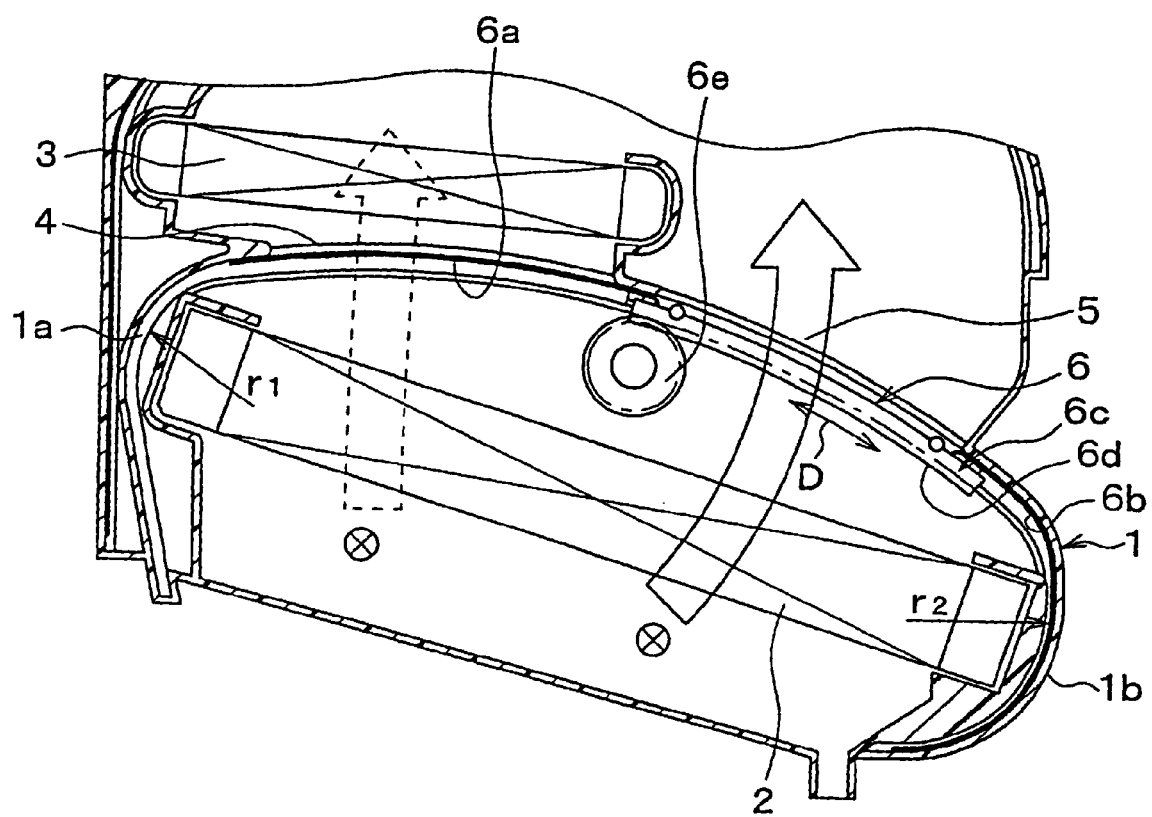
FIG. 1 is a cross-sectional view showing a main portion of a vehicle air conditioner, according to a preferred embodiment of the present invention.

In the preferred embodiment, an air passage switching device of the present invention is typically used for a vehicle air conditioner. FIG. 1 shows a part of the vehicle air conditioner. In FIG. 1, an air-conditioning case 1 (air duct)

is made of resin, and defines an air passage in which air, to be blown into a passenger compartment, flows. A cooling heat exchanger 2 for cooling air and a heating heat exchanger 3 for heating air are disposed in the air-conditioning case 1. The cooling heat exchanger 2 is a lower-pressure heat exchanger in a vapor compression refrigerator, and absorbs heat from air to be blown into the passenger compartment, so that air passing through the cooling heat exchanger 2 is cooled. The heating heat exchanger 3 heats air to be blown into the passenger compartment by using hot water (engine-cooling water) of a vehicle engine as a heat source. The air-conditioning case 1 has a warm air passage 4 and a cool air passage 5 downstream of the cooling heat exchanger 2. Air after passing the cooling heat exchanger 2 is introduced to the heating heat exchanger 3 through the warm air passage 4, and is introduced to a downstream side through the cool air passage 5 while bypassing the heating heat exchanger 3. Both of the air passages 4, 5 are opened and closed by a film switching door 6. That is, the opening degree of the warm air passage 4 and the cool air passage 5 is controlled by the film switching door 6.

Figure 2:
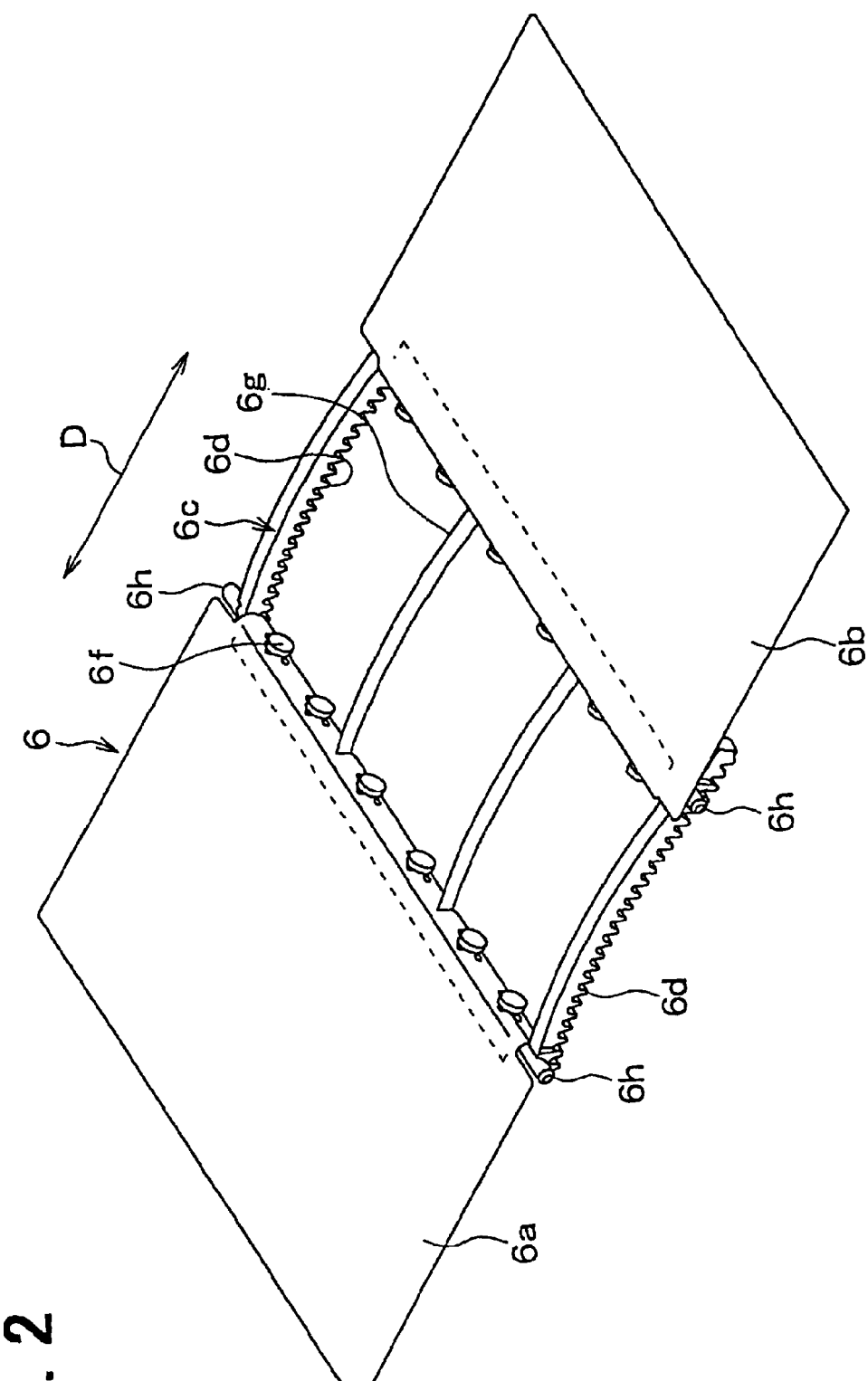
FIG. 2 is a perspective view showing a switching door having films for switching and controlling a communication state of a cool air passage and a warm air passage in the embodiment.

As shown in FIG. 2, the switching door 6 includes a first thin film 6a for closing the warm air passage 4, a second thin film 6b for closing the cool air passage 5, a rectangular frame 6c to which one end of each of the first and second thin films 6a, 6b is connected. The first and second thin films 6a, 6b are fixed to the rectangular frame 6c by using pins 6f, and the rectangular frame 6c is reinforced by reinforcement bars 6g. Guide pins 6h are slidably fitted in guide grooves that are provided in the air-conditioning case 1 in slidable so that the movement of the switching door 6 is guided by the guide grooves. Pinions 6e shown in FIG. 1 are engaged with rack gears 6d provided on the rectangular frame 6c, and are rotated by an electric motor such as a servomotor. When the pinions 6 are rotated, the thin films 6a, 6b are moved in accordance with the movement of the frame 6c so as to traverse the air passages 4, 5, thereby switching and controlling the communication states of the air passages 4, 5, respectively.

Specifically, when the first thin film 6a is placed in the warm air passage 4, the opening degree of the warm air passage 4 is throttled. That is, at least a part of the warm air passage 4 is closed. When the frame 6c is placed in the warm air passage 4 and the first thin film 6a is positioned outside the warm air passage 4, the warm air passage 4 is entirely opened. Similarly, when the second thin film 6b is placed in the cool air passage 5, at least a part of the cool air passage 5 is closed. When the frame 6c is placed in the cool air passage 5 and the second film 6b is outside the cool air passage 5, the cool air passage 5 is entirely opened. In this embodiment, the other ends of the first and second thin films 6a, 6b opposite to the connection ends connected to the frame 6c in a moving direction D are free ends. The frames 6c, the pinion 6e and the servomotor are provided for moving the films 6a, 6b.

In this embodiment, the bending stiffness of the first and second thin films 6a, 6b is set equal to or larger than $1\mu$ Newton (N)·m². Further, various parameters of the first and second films 6a, 6b are set so that a thickness, a glass transition temperature and a radius of curvature of the films 6a, 6b have the relationship indicated by the following formula (1).

$$t \leq 0.00578 \times Tg^{0.448} \times r^{0.333} \quad (1)$$

wherein, t is the thickness (mm) of the films 6a, 6b, Tg is the glass transition temperature (degree Fahrenheit (°K)) thereof, and r is the radius of curvature (mm) thereof.

Here, the radius of curvature r of the first thin film 6a is indicated by a radius of curvature r1 in a first film storage space 1a in which the first thin film 6a is received when the warm air passage 4 is entirely opened. In this embodiment, the radius of curvature r1 of the first thin film 6a is the smallest radius of curvature in an operational area of the first thin film 6a. The radius of curvature r of the second thin film 6b is a radius of curvature r2 in a second film storage space 1b in which the second thin film 6b is received when the cool air passage 5 is entirely opened. Similarly, the radius of curvature r2 of the second thin film 6b is the smallest radius of curvature in an operational area of the second thin film 6b, in this embodiment.

Figure 3A:
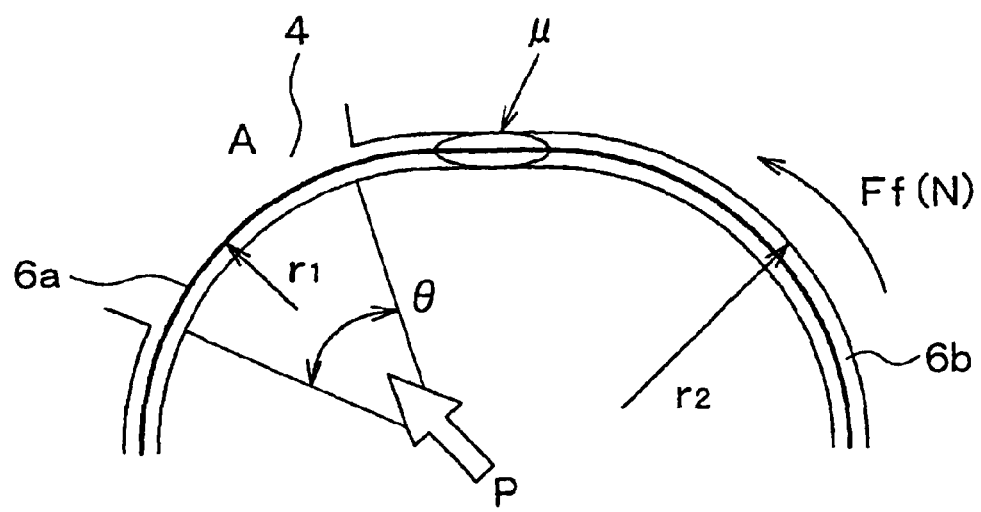
FIG. 3A is a schematic diagram for explaining an operational force Ff for moving the film.
Figure 3B:
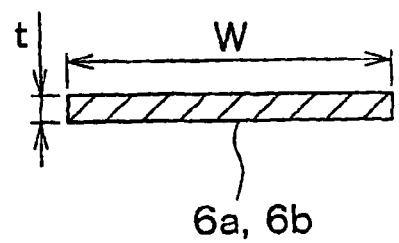
FIG. 3B is a cross-sectional view showing the film.

Next, operational effects and advantages in this embodiment will be described. First, the restriction effect of buckling deformation of the films 6a, 6b will be described. Operational force Ff for moving the switching door 6 (first and second films 6a, 6b) shown in FIG. 3A is expressed by the following formula (2).

$$Ff = \mu \cdot P \cdot A \cdot e^{\mu \cdot \theta} + (E \cdot W \cdot t^3)/(12 \cdot r1^2) + (E \cdot W \cdot t^3)/(12 \cdot r2^2) \quad (2)$$

wherein, $\mu$ is a friction coefficient between the films 6a, 6b and the air-conditioning case 1, P is differential pressure (pascal (Pa)) between a front side of the switching door 6 and a rear side thereof, A is a sectional area (m²) of the air passages 4, 5 closed by the switching door 6, E is Young's Modulus (N/m²) of the films 6a, 6b, r1 is the radius of curvature (m) of the films 6a, 6b in the air passages 4, 5 closed by the switching door 6, r2 is a radius of curvature (m) of the films 6a, 6b in a part that do not close the air passages 4, 5, W is a width dimension of the films 6a, 6b, t is a thickness dimension of the films 6a, 6b, e is the base ($\approx$2.71828182845) of the natural logarithm, and $\theta$ is an angle (radian) of the films 6a, 6b on the air passages 4, 5 closed by the switching door 6 around a center of curvature of the films 6a, 6b.

In a general air conditioner, the formula (2) can be simplified to the following formula (3).

$$Ff = \mu \cdot P \cdot A \quad (3)$$

Figure 4:
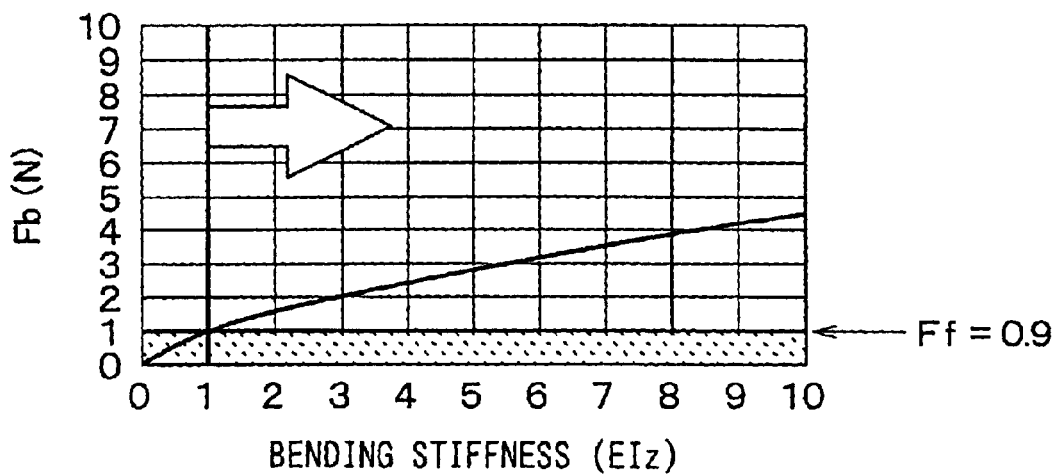
FIG. 4 is a graph showing a relationship between a buckling-generation operational force Fb in the film and a bending stiffness of the film, according to the embodiment.

In the general air conditioner, P$\approx$300 Pa, and A$\approx$15000 mm². Further, when the films 6a, 6b are made of polyethylene terephthalate (PET), Young's Modulus E is 3920 mN/m². In this case, the operational force Ff is about 0.9 N. The relationship between the buckling-generation operational force Fb where a press-buckling of the films 6a, 6b generates and the bending stiffness of the films 6a, 6b has been studied by the present inventors, and the test results of this relationship are shown in FIG. 4. As seen from FIG. 4, when the bending stiffness of the films 6a, 6b is set equal to or larger than 1 $\mu$N·m² (EIz), the buckling-generation operation force Fb of the films 6a, 6b becomes larger than 1N that is larger than the general operation force Ff of 0.9N. Accordingly, it can restrict the films 6a, 6b from being buckling-deformed, thereby preventing the films 6a, 6b from being deformed.

Figure 6:
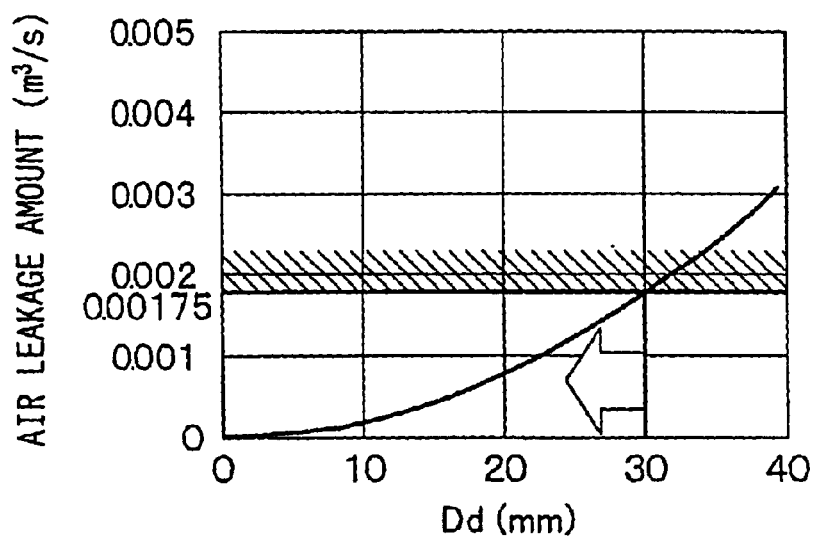
FIG. 6 is a graph showing a relationship between the deformation dimension Dd and an air leakage amount.
Figure 5A:
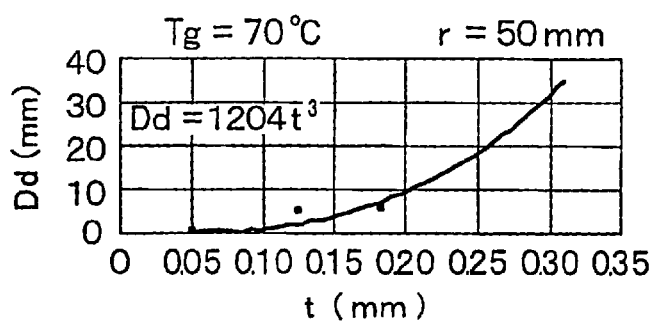
FIG. 5A is a graph showing a relationship between a deformation dimension Dd of the film and a thickness t of the film.
Figure 5B:
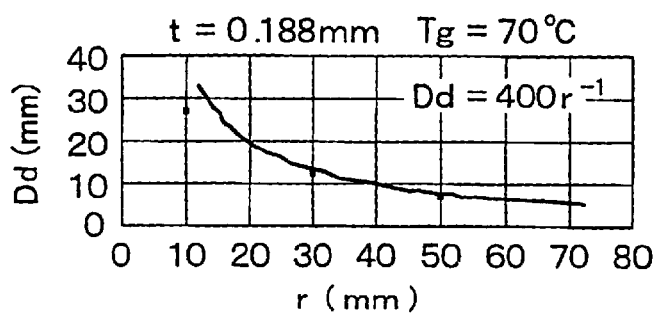
FIG. 5B is a graph showing a relationship between the deformation dimension Dd and a radius of curvature r of the film.
Figure 5C:
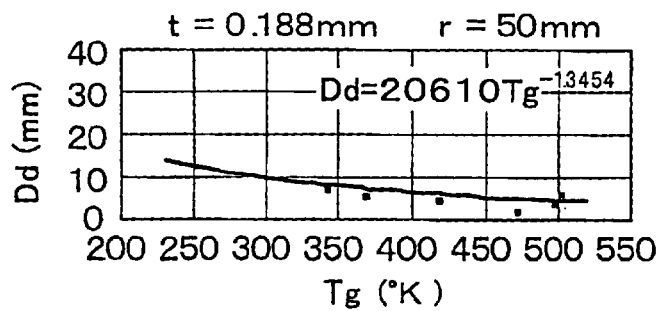
FIG. 5C is a graph showing a relationship between the deformation dimension Dd and a glass transition temperature Tg of the film.
Figure 5D:
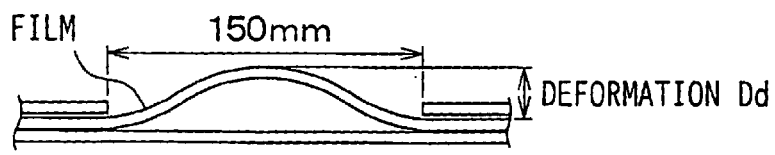
FIG. 5D is a schematic diagram for defining the deformation dimension Dd, according to the embodiment.

Next, a restriction effect of the deformation dimension Dd (deformed amount) of the films 6a, 6b will be described. The relationship between the deformation dimension Dd of the films 6a, 6b and the various parameters thereof has been studied by the present inventors, and the test results of this relationship are shown in FIGS. 5A–5C. Specifically, FIG. 5A shows the relationship between the deformation dimension Dd of the films 6a, 6b and the thickness t, when the glass transition temperature Tg is 70° C. and the radius of curvature r is 50 mm. FIG. 5B shows the relationship between the radius of curvature r of the films 6a, 6b and the deformation dimension Dd, when the glass transition temperature Tg is 70° C. and the thickness t of the films 6a, 6b is 0.188 mm. FIG. 5C shows relationship between the glass transition temperature Tg of the films 6a, 6b (PET) and the deformation dimension Dd thereof when the thickness t of the films 6a, 6b is 0.188 mm and the radius of curvature r is 50 mm. Further, FIG. 5D shows the deformation dimension Dd defined in the present invention. Further, FIG. 6 shows the relationship between an air leakage amount and the deformation dimension Dd.

When the films 6a, 6b are deformed, a clearance is generated between the films 6a, 6b and outer peripheral portions of openings of the air passages 4, 5. In the above-described tests shown in FIGS. 5A–5D and 6, the test film is inserted in a curved space of a test tool that is similar to that of the film storage spaces 1a, 1b. This insertion state is continued for 72 hours at a temperature of 80° C. in relative humidity of 75%, and is thereafter continued for 72 hours at a temperature of −30° C. A deformed amount generated in the test film is the deformation dimension Dd, as shown in FIG. 5D.

Then, the relationship between the deformation dimension Dd, the thickness t, the radius of curvature r and the glass transition temperature Tg is set as in the following formula (4), based on the test results shown in FIGS. 5A–5C.

$$Dd = 155085485 \times t^3 \times (r^{-1} \times Tg^{-1.3454}) \quad (4)$$

Further, as disclosed in JP-A-8-156570, when the air leakage amount is equal to or larger than 0.000175 m³/sec., cooling performance of the air conditioner is remarkably reduced. As shown in FIG. 6, the air leakage amount is smaller than 0.000175 m³/sec., when the deformation dimension Dd is smaller than 30 mm. When Dd=30 mm, the formula (4) can be rearranged to have $t = 0.00578 \times Tg^{0.448} \times r^{0.333}$. That is, when the thickness t of the films 6a, 6b is set equal to or smaller than $(0.00578 \times Tg^{0.448} \times r^{0.333})$, the deformation dimension Dd can be reduced so that the air leakage amount is reduced smaller than 0.000175 m³/sec., thereby preventing the cooling performance from being remarkably reduced. Further, in this embodiment, since an upper limit of the thickness t of the films 6a, 6b is determined by the formula (1), the upper limit is changed based on the material of the films 6a, 6b and the width dimension W thereof. On the other hand, a lower limit of the thickness t of the films 6a, 6b is determined based on a condition where the bending stiffness of the films 6a, 6b is set equal to or higher than 1 $\mu N \cdot m^2$. In this embodiment, the thickness t of the films 6a, 6b is set at 188 $\mu m$, and the width dimension W thereof is set at 196 mm, for example.

In the present invention, the PET is used as the material of the films 6a, 6b so that the bending stiffness of the films 6a, 6b is set equal to or higher than 1 $\mu N \cdot m^2$. However, without being limited to PET, the films 6a, 6b may be formed from a flexible film material having a low friction coefficient and a high sliding performance such as polybutylene terephthalate (PBT), polypropylene (PP), polyethylene naphthalate (PEN), polyphenylene sulfide (PPS), polyether imide (PEI), polyether sulfonate (PES), polysulfonate (PSF) and polyether etherketone (PEEK).

In the above embodiment, various parameters of the first and second films 6a, 6b, such as the thickness dimension t, the glass transition temperature Tg and the radius of curvature r, are set so that the relationship expressed by the formula (1) is satisfied while the bending stiffness thereof is set equal to or higher than 1 $\mu N \cdot m^2$. However, in the present invention, without being limited to this manner, only one of the relationship expressed by the formula (1) and the condition of the bending stiffness may be satisfied. Further, the present invention can be applied to various air passage switching devices, without being limited to the air passage switching device in the vehicle air conditioner.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An air passage switching device comprising:
   an air duct for defining an air passage through which air flows;
   a flexible film member being movable to traverse the air passage, for switching and controlling a communication state of the air passage; and
   a driving unit that extrudes the film member so as to move the film member,
   wherein the film member has a bending stiffness equal to or larger than 1 $\mu N \cdot m^2$.

2. The air passage switching device according to claim 1, wherein the film member is made of resin.

3. The air passage switching device according to claim 1, wherein:
   the air duct has a guide member for guiding a movement of the film member;
   the driving unit includes a frame member provided in the air duct, a gear member provided in the frame member, and a driving member engaged with the gear member to move the frame member in a moving direction; and
   one end of the film member is connected to the frame member and the other end of the film member is a free end in the moving direction so that the film member is movable along the guide member in accordance with the movement of the frame member.

4. An air passage switching device comprising:
   an air duct for defining an air passage through which air flows;
   a flexible film member being movable to traverse the air passage, for switching and controlling a communication state of the air passage; and
   a driving unit that extrudes the film member to move the film member,
   wherein the film member has a thickness t (mm), a glass transition temperature Tg (° K) and a radius of curvature r (mm) so that a relationship expressed by a formula of $t \leq (0.00578 \times Tg^{0.448} \times r^{0.333})$ is satisfied.

5. The air passage switching device according to claim 4, wherein the film member has a bending stiffness equal to or larger than 1 $\mu N \cdot m^2$.

6. The air passage switching device according to claim 4, wherein the film member is made of resin.

7. The air passage switching device according to claim 4, wherein:
   the air duct has a guide member for guiding a movement of the film member;
   the driving unit includes a frame member provided in the air duct, a gear member provided in the frame member, and a driving member engaged with the gear member to move the frame member in a moving direction; and
   one end of the film member is connected to the frame member and the other end of the film member is a free end in the moving direction so that the film member is movable along the guide member in accordance with the movement of the frame member.

* * * * *